United States Patent [19]

Sampath

[11] 4,431,281
[45] Feb. 14, 1984

[54] SPLIT BEAM MICROFICHE READER

[76] Inventor: Prativadi I. Sampath, 2596 Carmel Valley Rd., Del Mar, Calif. 92014

[21] Appl. No.: 433,632

[22] Filed: Oct. 12, 1982

Related U.S. Application Data

[63] Continuation-in-part of Ser. No. 333,087, Dec. 21, 1981, abandoned.

[51] Int. Cl.$^3$ .............................................. G03B 23/08
[52] U.S. Cl. ...................................... 353/78; 353/99; 353/27 R
[58] Field of Search ...................... 353/27 R, 26 R, 30, 353/34, 37, 77, 78, 99, 120; 355/46; 40/362, 367

[56] References Cited

U.S. PATENT DOCUMENTS

| | | | |
|---|---|---|---|
| 3,063,334 | 11/1962 | Smith | 353/37 X |
| 3,375,753 | 4/1968 | Ramsell | 353/99 |
| 3,667,839 | 6/1972 | Artaud | 353/27 R |
| 3,734,605 | 5/1973 | Yevick | 353/30 |
| 3,877,802 | 4/1975 | Greenspan | 353/77 |
| 3,941,467 | 3/1976 | Kapary et al. | 353/27 R X |
| 4,105,319 | 8/1978 | Wells et al. | 353/120 |

Primary Examiner—Harry N. Haroian
Attorney, Agent, or Firm—Charmasson & Holz

[57] ABSTRACT

A compact, portable microfiche reader is provided which is characterized by two series of mirrors which split the beam, and fold it, as two separate components, enabling the reader to be much more compact than a standard microfiche reader. A typewriter-style fiche holder is also incorporated in the unit.

6 Claims, 4 Drawing Figures

SPLIT BEAM MICROFICHE READER

BACKGROUND OF THE INVENTION

The present invention is an improvement on a prior invention set forth in application No. 333,087, filed Dec. 21, 1981, now abandoned by the same inventor. This application is a continuation-in-part of the above-stated application.

The invention set forth in the prior application constituted two indexed rotary faceted mirrors which cooperated to in essence sweep the image from the film one band at a time. The purpose of this was to reduce the size of the microfiche reader which would be required to produce an image on the standard 7"×5" screen. As the light beam expands through the film to an imaging screen, it obviously becomes wider and wider. Even if this beam is folded several times to make it more compact as it expands, it nevertheless is limited in the degree of compactness achievable because of the wide cross-section of the beam as it approaches its full focused dimension.

The unit in the parent application to this application which utilized the rotary faceted mirrors was effective in enabling a much smaller fiche reader case to be used. However, naturally when one is using a pair of faceted mirrors which must be not only rather precisely mounted or ground, and pivoted, and also must be synchronized, an element of expense is encountered, as well as a proneness for mechanism failure due to the complexity of the operation of the system.

There is a need for a system with fewer, or no, moving parts, to eliminate the additional expense and complexity, but which would still split the expanding beam within the fiche reader so that the fiche reader is capable of being contained in a much smaller space.

SUMMARY OF THE INVENTION

The present invention fulfills the above-stated need by providing a beam-splitting microfiche reader which has no imaging moving parts other than focus, which splits the beam by means of stationary mirrors. These mirrors, in the preferred embodiment, divide the main beam into two component beams representing the upper and lower half of the image, and each component is separately folded, passing through the other beam, to be imaged in place on the final screen. This permits a substantial savings in the dimensioning of the unit, especially the height.

In another improvement, a typewriter-like carriage system is utilized, in cooperation with a transparent fiche-holding envelope, to be rolled down, up, tabbed sideways, or indexed up and down, just as is a sheet of paper in a typewriter, to conveniently and quickly move from one of the many printed pages on the microfiche film to the next.

DETAILED DESCRIPTION OF THE PREFERRED EMBODIMENT

Figure 2:
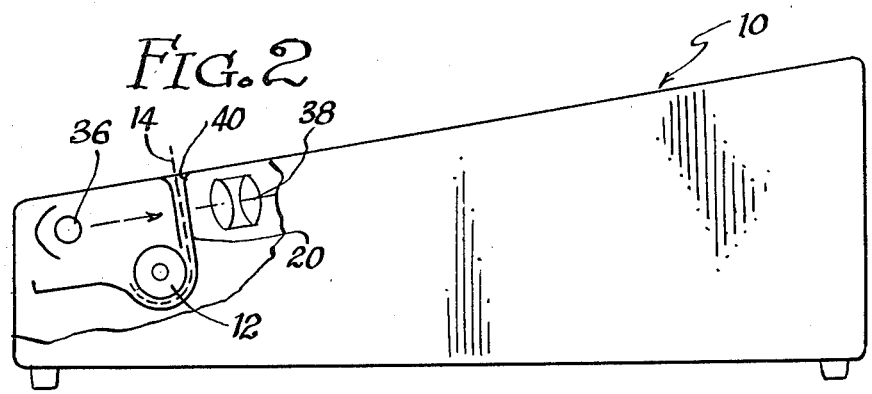
FIG. 2 is a diagrammatic side view illustrating the general shape of the fiche reader with a portion cut away to illustrate diagrammatically the fiche positioning and illumination system.
Figure 3:
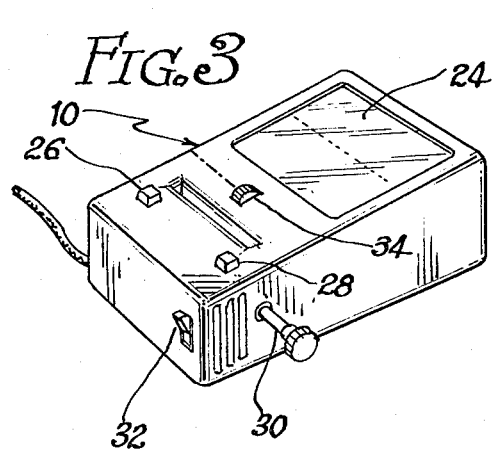
FIG. 3 is an elevation view of the fiche device.
Figure 4:
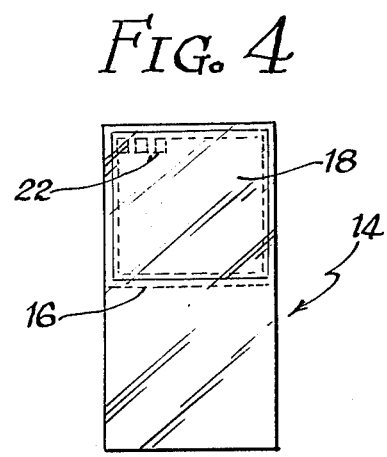
FIG. 4 is an elevation view of the fiche-holding envelope.

The fiche reader is mounted inside a housing 10 which is generally rectangular in plan form and inclined from front to rear. The fiche-holding and imaging system is best shown in FIGS. 2 and 3. A typewriter-style roller 12 holds the bottom portion of a fiche-holding envelope 14, which has a seam 16 across the center, with the upper portion being open at the top to accept a fiche strip 18.

As shown in FIG. 2, the roller 12 moves the fiche envelope 14 along a guide 20 to achieve the proper vertical adjustment to isolate the particular written text page 22 that the reader wishes to view on the screen 24.

Lateral movement of the fiche strip 18 is achieved by the tab button 26, which causes the carriage to tab over just as in a regular typewriter. This tab is adjustable to permit it to be set to jump the standard increment for any of several standard spacings between text pages on a fiche strip. The same is true of the index button 28, which will achieve vertically what the tab button 26 achieves horizontally. Of course, either the tab 26 or the index 28 settings may be adjusted, or overcome, by use of the knobbed shaft 30. Other features on the case include the power switch 32, the focus adjust 34, and as already mentioned, the reading screen 24.

As shown in FIG. 2, a source light 36 which is preferably the type of light requiring no subsequent lensing other than the focus lens system 38 is used. The upper portion 40 of the film guide 20 is flared to promote easy insertion and removal of the envelope.

The above description describes the way in which the film is moved around within the case, and generally the way in which the light source passes light through the film and through the focusing system. The most important part of the invention, however, lies in the treatment of the expanding beam after it passes through the focusing system and is focused to a length which will require it to impinge on the screen 24.

Specifically, this is achieved by splitting the principal beam 42 into upper and lower component beams 44 and 46, respectively. Although these lenses might at first blush appear to represent a rather simple or arbitrary lens arrangement, they are actually the result of a considerable amount of experimenting and calculation. It is difficult for the beams to be folded in a compact area without one beam or component beam being obstructed by one of the mirrors which is used to fold the other beam.

Figure 1:
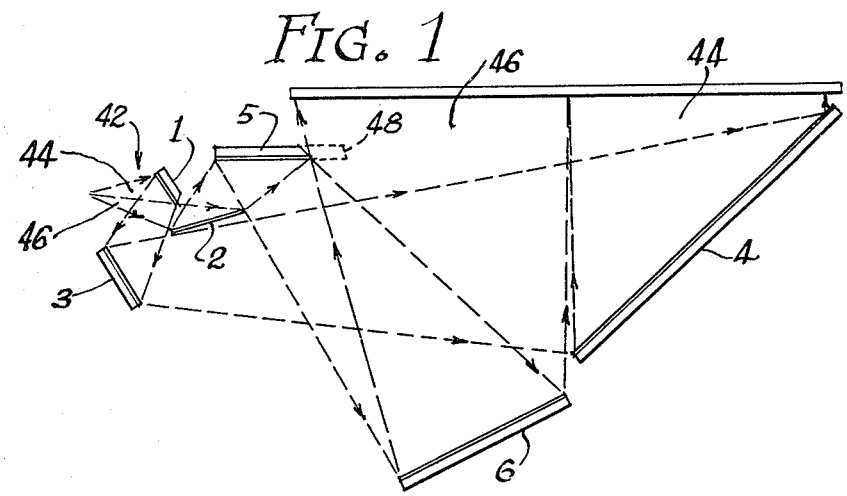
FIG. 1 is a ray diagram illustrating the paths of the component beams.

The first component beam 44 initially strikes mirror 1, which actually reflects the component beam rearwardly to mirror 3, which then passes the beam forwardly to mirror 4, grazing just beneath mirror 2, which is made especially thin so that the beam will clear it. After impinging on mirror 4, the upper portion of the image taken from the fiche is focused onto the screen as shown in FIG. 1.

The lower beam, rather than being rearwardly reflected, achieves an equivalent length by being reflected by mirror 2, upwardly to almost horizontal mirror 5, and then downwardly, barely missing mirror 2, where it impinges on mirror 6, and back up onto the screen to form the lower half of the text image picked from the microfiche. Note that the beam as it passes from mirror 6 to the lower portion of the screen grazes mirror 5, again indicating the precision with which the mirrors must be positioned. There is a dotted extension 48 of mirror 5 which indicates the possibility that some mirrors might advantageously be larger, and be only partially silvered, so that they both reflect light but also permit the passage through the partially attenuated light to form the other image component.

While the preferred embodiment of the invention has been described, other modifications may be made thereto and other embodiments may be devised within the spirit of the invention and scope of the appended claims.

What is claimed is:

1. An imaging system having a screen and a source of light producing an expanding beam directed through a film-holding area and means for focusing said beam on said screen, and wherein the expanding beam is split into at least two beam components which are separately folded prior to focusing it on said screen, comprising:
    (a) a plurality of initially illuminated mirrors which together span the entire cross-section of said beam downstream of said film, each splitting off a beam component from said beam;
    (b) for each of said initially illuminated mirrors, a downstream mirror system for same, said downstream mirror systems each cooperating with respective initially illuminated mirrors to fold the respective beam components onto said screen;
    (c) said system being disposed within a microfiche reader, said screen being generally horizontally extended and said downstream mirror systems each including a plurality of mirrors;
    (d) there being two initially illuminated mirrors, comprising the first and second mirrors, and said downstream mirror systems comprise respectively a third and fourth mirror for said first mirror, and a fifth and sixth mirror for said second mirror, and said beam components comprise a first and second component split off said beam by said first and second mirror, respectively; and
    (e) the first beam component being folded by said third mirror and passing beneath said second mirror.

2. Structure according to claim 1 wherein said second mirror is thinner than the remainder of said mirrors to permit the passage of said first beam component therebeneath.

3. Structure according to claim 2 wherein said fourth and sixth mirrors fold the respective beam components and direct them substantially orthogonally against said screen.

4. Structure according to claim 3 wherein said sixth mirror directs said second beam component against said screen such that it grazes the edge of said fifth mirror on the side thereof away from said source light.

5. Structure according to claim 4 wherein said film-holding area has mounted therein an indexed roller system for engaging a film-holding envelope, and including a transparent film-holding envelope having an upper portion for the insertion of a film strip and a lower portion separated from the upper portion by a seam to permit the engaging of the lower portion by said roller system.

6. Structure according to claim 1 wherein said first beam component is folded into a pattern that is wider longitudinally and shallower than the pattern of said second beam component.

* * * * *